(No Model.)

G. W. ARCHER.
GYNECOLOGICAL CHAIR.

No. 252,169.

3 Sheets—Sheet 1.

Patented Jan. 10, 1882.

Attest.
E. Scott
John C. Burns

Inventor:
George W. Archer
per R. F. Osgood,
Atty.

(No Model.)
G. W. ARCHER.
GYNECOLOGICAL CHAIR.
No. 252,169.
3 Sheets—Sheet 2.
Patented Jan. 10, 1882.
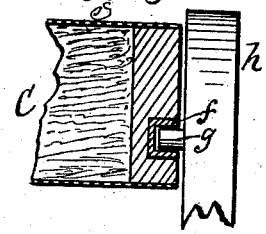
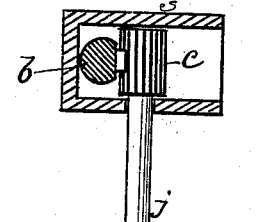
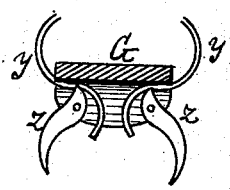
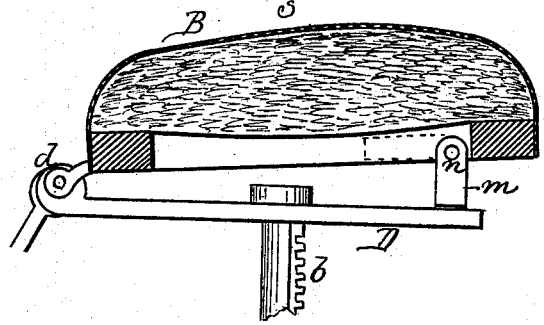
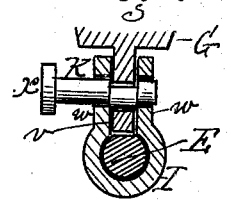
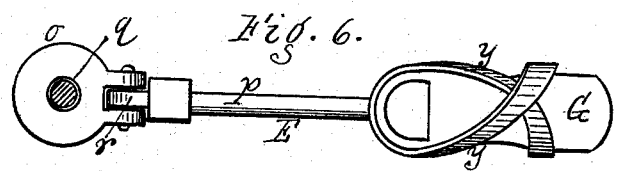
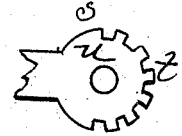
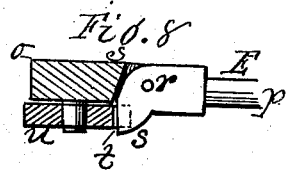
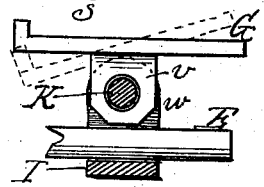
Attest.
E. Scott.
John C. Burns.
Inventor.
George W. Archer
per R. F. Osgood
Atty (No Model.)  3 Sheets—Sheet 3.
G. W. ARCHER.
GYNECOLOGICAL CHAIR.
No. 252,169. Patented Jan. 10, 1882.
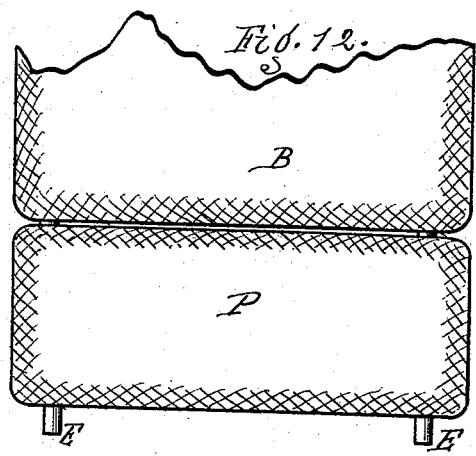
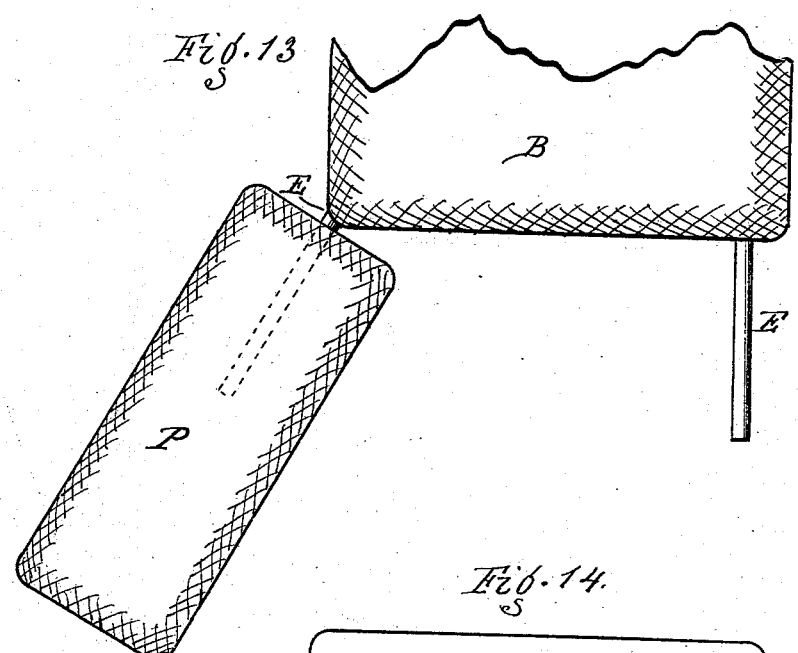
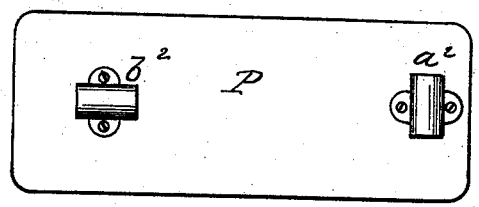
Attest.
E. Scott.
John C. Burns.
Inventor.
George W. Archer,
Pr. R. L. Osgood,
Atty.

UNITED STATES PATENT OFFICE.

GEORGE W. ARCHER, OF ROCHESTER, NEW YORK.

GYNECOLOGICAL CHAIR.

SPECIFICATION forming part of Letters Patent No. 252,169, dated January 10, 1882.

Application filed March 30, 1880. (No model.)

*To all whom it may concern:*

Be it known that I, GEORGE W. ARCHER, a citizen of the United States, residing at Rochester, Monroe county, New York, have invented certain new and useful Improvements in Gynecological Chairs; and I do hereby declare that the following is a full, clear, and exact description of the same, reference being had to the accompanying drawings, in which—

Figure 1:
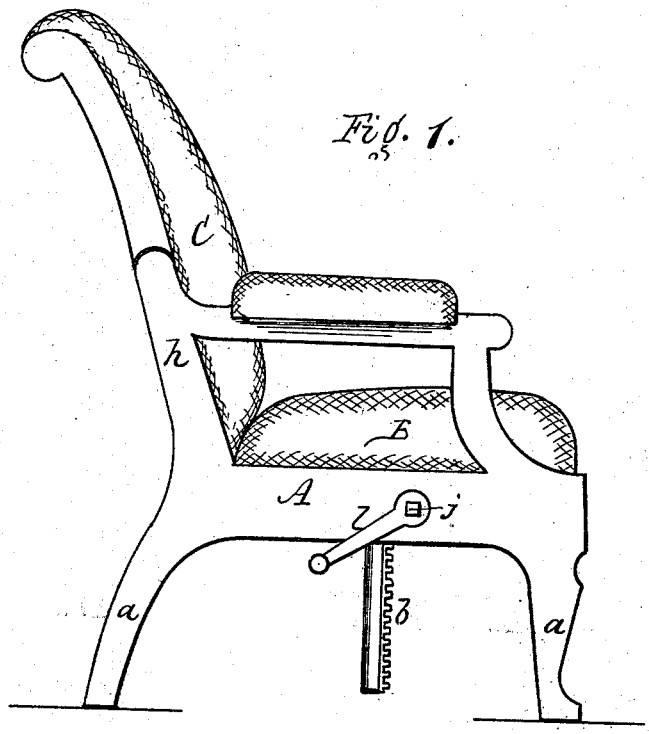
Figure 2:
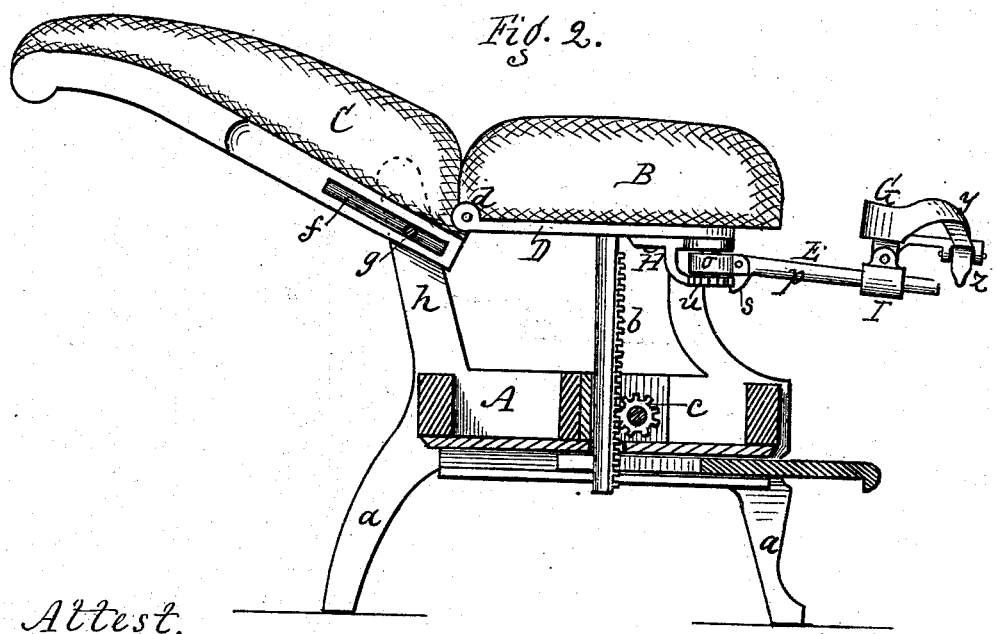

Figure 1 is a side elevation of the chair in its natural position. Fig. 2 is a sectional elevation of the same converted into an operating-table. Figs. 3, 4, 5, 6, 7, 8, 9, 10, 11, 12, 13, and 14 are detail views.

My improvement relates to operating-chairs for physicians' and surgeons' use; and it consists in the construction and arrangement of parts hereinafter more fully described and claimed.

A represents the chair-frame, which is supported by legs $a\ a$. B is the seat, and C is the back. The seat is elevated by means of a rack, $b$, and pinion $c$, and the back is hinged or pivoted to the seat at $d$, so that as the seat is raised the back will be thrown back, as shown in Fig. 2. To compensate for or allow the necessary sliding movement of the back as it is thrown back, the edges of said back are provided with longitudinal slots $f f$, Figs. 2 and 3, in which rest studs $g\ g$ of the chair-standards $h\ h$. As the seat is raised or lowered the back will move automatically on the studs and adapt itself either to the upright position shown in Fig. 1 or the horizontal position shown in Fig. 2. The patient, once seated in the chair, can be raised and thrown back in the necessary position for treatment without difficulty, the seat and back, when so elevated, forming a table of convenient form for physicians and surgeons.

$i$ is a ratchet on the shaft of pinion $c$, and $k$ is a pawl which engages therewith for the purpose of holding the shaft from turning when the seat is elevated.

$l$ is a crank connected with shaft $j$, which crank may be either fixed or removable.

D is a spider or cross-head fixed rigidly to the top of the rack $b$, said cross-head forming the support to the seat. At the rear the seat is attached to the spider by the pivots $d$, but at the front end the seat is free to swing up or down.

$m$ is a block pivoted at $n$ to the under side of the seat-frame, as shown in Fig. 5. When the block is turned down, as shown in full lines, the front end of the seat will be elevated and stand higher than the rear portion, which is frequently necessary in order to properly adjust the body of the patient, the block $m$ in that case being supported by the spider D; but when said block is turned up, as indicated by the dotted lines, then the seat rests in front, on top of the spider, and there lies level. By the means before described the seat and back can be adjusted in a level position, or either the back or the seat can be made inclined and stand higher than the other part.

E E are arms, and G G are foot-rests or stirrups attached to the arms for the purpose of holding the feet of the patient. The arms are attached to the front of the seat B, on opposite sides of the chair, and project forward. They are made to adjust or swing horizontally, and are fixed in any desired position by the following means: Each of the arms E is made in two parts, $o$ and $p$, the part $o$ consisting of a circular head, which turns freely on a bearing, $q$, of the bracket H, while the part $p$, consisting of the arm proper, is pivoted at $r$ to the head, so as to turn vertically, and is provided at its inner end with a downwardly-projecting wing, $s$, which engages with any of a series of notches or teeth, $t\ t$, of a fixed circular head, $u$, which forms a part of the bracket and rests below the head $o$.

It will be seen that by raising the arm $p$ so that the wing $s$ will clear the notches $t\ t$ the arm can be swung around to any desired position, and by dropping the arm again the wing will re-engage with the notches and hold the arm firm.

When the chair is used as an office-chair, as shown in Fig. 1, the arms are swung entirely under the seat, and are out of sight. Fig. 6 is a plan of one of the swinging arms. Fig. 7 is a plan of the notched head, and Fig. 8 is a vertical section, showing the engagement of the wing $s$ with the notched head.

The foot-rests G G consist of plates attached to socket-pieces I I, which slide on the arms E E. They are attached and rendered adjustable to different inclinations by the following means: Each of the plates has a vertical tongue, v, Figs. 9 and 10, which rests between lugs w w of the socket-pieces I. The lower end is of polygonal form, having flat edges standing at different inclines, which rest upon the arm E.

K is an eccentric, which passes through the lugs w w, and also through the tongue v, and has on the outside a head, x, by which it is turned. By turning the eccentric the square end of the tongue is made to bind down upon the arm E, thereby clamping the foot-rest in place. By loosening the eccentric the foot-rest can be moved longitudinally on the arm, and can also be tilted or inclined, in which case one of the inclined edges on the tongue rests on the arm and can be clamped down thereon. This is a convenient means for adjusting and securing the foot-rests. The foot-rests are provided with straps y y, which cross each other, as shown in Fig. 6, and are bound down upon the feet by passing the loose ends over eccentric-levers z z at the toe of the foot-rest, as shown in Fig. 11. When not in use the arms are turned under.

L is a slide in the body of the chair, which may be extended and used to hold instruments or other articles, as may be desired.

P is a separate cushion, provided at opposite ends with eyes or sockets $a^2$ $b^2$, one of which, $a^2$, stands transversely and the other, $b^2$, longitudinally with the cushion. This cushion is used in connection with the seat B in two different positions, as shown in Figs. 12 and 13. In Fig. 12 the cushion simply forms an extension of the seat by resting bodily up against it, for the purpose of forming an extension to the length of the table or couch. In this case the socket $a^2$ at one end of the cushion slides upon one of the arms E, while at the opposite end the cushion rests loosely on the other arm. In Fig. 13 the cushion stands angularly to the seat, in which case the socket $b^2$ at the other end slides on the arm, and the arm itself is set at the proper angle. In this condition the apparatus is adapted to Simms' position, in which the limbs of the patient must be supported outside the table and at an angle thereto.

Having thus described my invention, what I claim as new, and desire to secure by Letters Patent, is—

1. In an operating-chair, the combination of the chair A, having standards h h, provided with inwardly-projecting studs g g, and the seat B and back C, hinged together, the back provided with side slots, f f, which receive the studs and allow the back to slide forward and back, the seat being raised and lowered by the rack b and pinion c, as herein shown and described.

2. In an operating-chair, the combination of the vertically-moving seat B, the back C, hinged thereto and having a free sliding motion, the rack b, to which the seat is attached, the pinion c, engaging with the rack and operating the same, and the chair-frame A, having standards provided with studs g g, which enter slots f f of the back, as shown and described, and for the purpose specified.

3. In an operating-chair, the combination of the arm E, the foot-rest G, the socket-piece I, to which it is pivoted to allow vertical adjustment, said socket-piece resting on the arm, the vertical tongue v of the foot-rest resting between lugs of the socket-piece and having a polygonal end resting upon the arm, and the tightening cam or eccentric K, as shown and described.

4. In an operating-chair, the combination, with the chair A and the arms E, attached thereto, of the separate cushion P, provided on its under side with the two socket-pieces $a^2$ $b^2$, one standing transversely and the other longitudinally to the cushion and sliding upon the arms, whereby said cushion can be made an extension to the seat in different positions, as specified.

In witness whereof I have hereunto signed my name in the presence of two subscribing witnesses.

GEO. W. ARCHER.

Witnesses:
R. F. OSGOOD,
JACOB SPAHN.